(12) United States Patent
Nykyforov

(10) Patent No.: US 9,015,581 B2
(45) Date of Patent: Apr. 21, 2015

(54) SELF-ADJUSTING DOCUMENT LAYOUTS USING SYSTEM OPTIMIZATION MODELING

(75) Inventor: Vyacheslav Nykyforov, Littleton, MA (US)

(73) Assignee: Vistaprint Schweiz GmbH, Winterthur (CH)

(*) Notice: Subject to any disclaimer, the term of this patent is extended or adjusted under 35 U.S.C. 154(b) by 142 days.

(21) Appl. No.: 13/430,668

(22) Filed: Mar. 26, 2012

(65) Prior Publication Data

US 2013/0254655 A1    Sep. 26, 2013

(51) Int. Cl.
G06F 17/00    (2006.01)
G06F 17/21    (2006.01)

(52) U.S. Cl.
CPC .................... G06F 17/211 (2013.01)

(58) Field of Classification Search
USPC .......................... 715/243, 244, 245, 246, 247
See application file for complete search history.

(56) References Cited

U.S. PATENT DOCUMENTS

| | | | | |
|---|---|---|---|---|
| 5,638,522 A * | 6/1997 | Dunsmuir et al. | ............ | 715/763 |
| 5,764,239 A * | 6/1998 | Misue et al. | ............... | 345/440 |
| 5,909,678 A * | 6/1999 | Bergman et al. | .............. | 1/1 |
| 7,228,504 B2 * | 6/2007 | Jones et al. | ................. | 715/749 |
| 8,453,053 B2 * | 5/2013 | Lee et al. | ................. | 715/271 |
| 8,654,126 B2 * | 2/2014 | Gansner et al. | ............... | 345/440 |
| 2002/0116417 A1 * | 8/2002 | Weinberg et al. | ........... | 707/517 |
| 2007/0067711 A1 * | 3/2007 | Woodall et al. | ............... | 715/505 |
| 2007/0073697 A1 * | 3/2007 | Woods | ......................... | 707/9 |
| 2009/0313267 A1 * | 12/2009 | Girgensohn et al. | ........ | 707/100 |
| 2010/0190145 A1 * | 7/2010 | Singer et al. | ................ | 434/335 |
| 2010/0269037 A1 * | 10/2010 | Atkins | ......................... | 715/244 |
| 2011/0295575 A1 * | 12/2011 | Levine et al. | ..................... | 703/2 |
| 2012/0324385 A1 * | 12/2012 | Johnston et al. | ............ | 715/765 |

* cited by examiner

*Primary Examiner* — Laurie Ries
(74) *Attorney, Agent, or Firm* — Jessica Costa

(57) ABSTRACT

Methods and systems for optimizing a layout of a document constructed based on a template document, where the template document comprises a plurality of individually-specified components including one or more individually specified user-content components configured to receive user content from a user of the template document. An energy model of the layout of the user-content components in the user document is generated based on original positions and sizes of the user-content components in the template document. Positions of corresponding components in the user document are automatically adjusted to minimize the energy of the user-content component layout in the user document.

18 Claims, 11 Drawing Sheets

SELF-ADJUSTING DOCUMENT LAYOUTS USING SYSTEM OPTIMIZATION MODELING

BACKGROUND OF THE INVENTION

The present invention relates generally to document layout, and more particularly to systems and methods for automatically optimizing the layout and attributes of components of an electronic document based on attributes of the content of the components.

The use of computers in generating designs of both printed and electronic documents is ubiquitous.

To assist designers and customers in quickly creating personalized and customized graphic, printed, and electronic product designs, several applications and websites offer fillable document design templates which include editable fields for receiving user-inserted content (such as text or images). For example, the website Vistaprint.com markets a variety of printed products, embroidered products, engraved products, and electronic products such as website hosting and accompanying traditional and mobile-ready web pages. Vistprint.com allows a user to select a customizable design template prepared by employees or agents of the company and to use online tools provided by the site to incorporate the user's personal information and content into the templates to create a custom product design. When the design is completed to the user's satisfaction, the user can place an order through the site for production and delivery of a desired quantity of the corresponding product.

The content of a design typically includes a layout, text and/or image content, a color scheme, and a font scheme.

Developments in computer and internet technologies has lead to the common practice of defining graphic and electronic versions of a design using a markup language such as HTML, DHTML, VML, XML, etc., each of which is well-known in the art, wherein various individual components of a design can be individually specified and simultaneously rendered on an electronic display such as a computer screen, a smartphone screen, a tablet or pad screen. In a common implementation, a design template typically includes one or more of an individual layout component, one or more individual image components, one or more individual font scheme components, and one or more individual color scheme components. Each individual component may be individually specified using a markup language component "tag" and may further define component-specific attributes for that particular component. A layout component may specify the overall size of the design, along with the placement and size of all fillable text and image containers within the design. In some templates, the size and placement of the text and/or image containers may be edited by the user of the template, while other templates are defined to lock the size and position of the containers to prevent the user from editing the underlying layout.

Each image component in a design template may be designated as either a foreground image or a background image. Typically, each image is placed in a corresponding defined image container as set forth in the layout component.

When a template designer creates a design template, the template designer strategically places the various components so as to allow insertion by a user of the template of content into each of the variable-content components (hereinafter "user-content components") while still achieving an aesthetically pleasing design. For example, FIG. 1A shows an example of a customizable design template 100, and FIG. 1B shows the corresponding component view 100'. As illustrated in FIG. 1B, the template 100 is implemented by rendering a plurality of different text components 101, 102, 103, 104, 105, 106, 107, over a background image component 130 with image features 131 and 132. A design template comprises a specification of each component in the design, including corresponding attributes such as size, position, and other attributes specific to the type of component. For example, a text component would typically include a size attribute, a position attribute, a font style attribute, a font size attribute, a font color attribute, and other attributes such as a wrapping indicator that indicates whether text that is too long for the width of the specified size is to wrap to the next line, etc. A text component may also include an attribute that indicates whether or not a user can edit the text content in the text component, and may further include a default value for the text content. An image component may include corresponding attributes such as size (height and width) and position, z-index (which indicates on which layer the image should be rendered), image content (e.g., the location and name of an image file) that is to be rendered as content in the image component, and other attributes such as whether a user can replace the image content in the image component.

In the particular design template shown in FIGS. 1A and 1B, the various text components 101-107 containing the sample text "Company Name", "Headline Here", "Special Offer", "Phone/Other", and "Address Line 1", "Address Line 2" and "Address Line 3" are designed as placeholder user-content components where a user can insert their own customer-specific text. Based on the sizes, positions, and sample text, of the various text components, a human viewing a design template can make inferences about the template designer's intent when the template was created. In the illustrated design, the placeholder text components 101-107 containing the sample text are placed in particular positions in the design relative to each other and to particular features 131 and 132 in the background image 130. For example, the "Company Name" and "Headline Here" text components 101 and 102, are prominently placed near the top of the design template 100 with the inferred intent of the template designer that the "Company Name" and any headline or title of the design will catch the reader's attention. Further inferences of the template designer's intent can be drawn based on the size of the fonts of each component relative to each other, and from the spacing of the various text components relative to each other. For example, the components 105, 106 and 107, containing sample text "Address Line 1" 115, "Address Line 2" 116 and "Address Line 3" 117, each have identical font size, and are each positioned on separate lines with minimal spacing near the bottom of the template. It may be inferred based on these observations that the intent of the template designer is that these three text components are closely related and should stay together. Further inferences can be drawn by a human observing the template 100 or template layout 100'. The challenge, however, is to develop a technique for automating the recognition of the layout and any inferences that can be drawn therefrom, and then to automatically adjust the layout in such a way that would be aesthetically pleasing or comfortable to a human viewer and which takes into account the intent of the template designer based on inferences that are automatically derived from the original template prior to entry of user content.

The component view 100' in FIG. 1B of the design 100 shown in FIG. 1A shows a box around each text component 101, 102, 103, 104, 105, 106 and 107, indicating the position and size of each of the text components specified in the template. From the positioning of the text components 101-107 relative to the features 131 and 132 in the background image 130, one can further infer that none of the content of the components 101-107 is intended to cross the boundaries of the features 131 or 132. This can be inferred from the fact that the text components 101-107 are sized and positioned such that none of the boundaries of the text components as specified in the template 100' cross over the boundaries of any of the important background image features 131, 132.

When a template designer designs a design template for use by $3^{rd}$-party users, the designer typically creates the design with a specific purpose, specific intended use, and/or specific design aesthetics in mind. When the resulting template is used in such a way as to fulfill the designer's intent, for example by inserting the designer's intended contemplated amount of text or size of image into corresponding containers in the design, the resulting design will typically be aesthetically pleasing. However, oftentimes, the amount of text content or size of an image that a $3^{rd}$-party user desires to place in a corresponding container of the design is more than that contemplated by the designer. This can result in text-wrapping and overlapping of user-inserted content with content of other components and/or fixed visual features of the background or other image(s).

FIGS. 2A and 2B show a user document 200 (FIG. 2A) and corresponding component view 200' (FIG. 2B) after a user has inserted text into some of the user-editable text components 101, 102, 103, 104, 105, 107 of the template 100. In this example, the user has inserted text 222 in the header text component 102. The amount of text 222 does not fit on one line, and the last word has wrapped to a second line. In addition, the "Phone/Other" component text 224 that was inserted by the user is also too long for the contemplated amount of text and consequently wrapped from one to three lines, which overlaps the text content 225 and 227 of the text components 105 and 107.

While it may be possible for the user to make changes to the amount of text content in each of text components 102 and 104, it may be desirable to have a system which could automatically adjust parameters and/or attributes of the editable components themselves, based on the size or amount of inserted user content, to reconfigure the design to a more aesthetically pleasing design.

SUMMARY OF THE INVENTION

Embodiments of the present invention include a method for optimizing a layout of a document constructed based on a template document, where the template document comprises a plurality of individually-specified components including one or more individually-specified user-content components configured to receive user content from a user of the template document. The method includes the steps of generating, by a computer, an energy model of the layout of the user-content components in the user document based on original positions and sizes of the corresponding user-content components in the template document, and automatically adjusting one or more positions of corresponding respective user-content components in the user document to minimize the energy of the user-content component layout in the user document. The energy of the user-content component layout is calculated automatically based on a deformation energy of spacing between user-content components in the layout and one or more of user-content component overlap energy, background overlap energy, color proximity energy, and font size reduction energy.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Figure 1A:
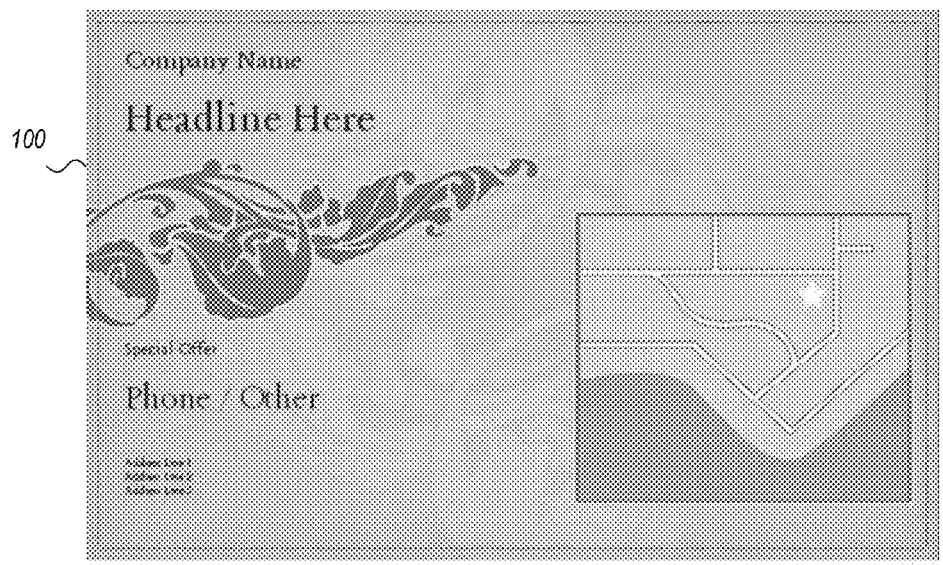
FIG. 1A is a view of an exemplary template document.

The present invention solves the foregoing problems and disadvantages with a system and method for providing dynamic reactive layout optimization based on the determined size and/or amount of user-inserted content.

In one embodiment, in response to user-insertion of content into one or more user-editable content containers of a template document, the system infers the template designer's intent with respect to the placement of user-inserted content relative to other user-inserted content and to fixed (non-user-editable) visible content in the template, and adjusts one or more attributes or parameters of the editable user-content components to generate an optimized component layout that complies with the template designer's aesthetic intent.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations area not shown or described in detail to avoid obscuring aspects of the invention.

In general, embodiments of the present invention include systems and methods which utilize the concept of reactive layout. A "reactive layout" is a layout that can adjust itself to different amounts of content. In one embodiment, the layout adjusts attributes and/or parameters of text or image components, reacting to the text payloads in various text fields or to the size of image(s) inserted as content to image components. In an embodiment, the layout can further adjust, reacting to detected boundaries of fixed visible imagery in the design.

As used herein, the term "dimensionally-adjacent" refers to components which are measurable along a given dimension. For example, in a user document having text components which are arranged vertically, each component from the top to the bottom is dimensionally-adjacent to the next lower component in the vertical arrangement.

In an embodiment, the design templates do not include any additional information, and adjustments to the layout are made using image processing techniques.

In an alternative embodiment of the present invention, design templates are configured to include additional information help the layout react to the payloads to produce an aesthetically pleasing result.

FIGS. 3-9 illustrate embodiments of the present invention in which a reactive layout automatically adjusts itself by reacting to the amount of text or size of image content in the text or image containers in a selected template. In the illustrated embodiments, a system attempts to infer the template designer's intent based on the location and sizes of the user-editable text and/or image containers, as well as information inferred from the designer's sample text, the background image, and other non-user-editable images. In an embodiment, a template designer's intent is inferred and respected by preserving or otherwise modeling relative distances between user-content containers (such as text and/or image components), as well as by avoiding crossing significant visible features which may be present in the background or other non-user-editable images or components.

Figure 3:
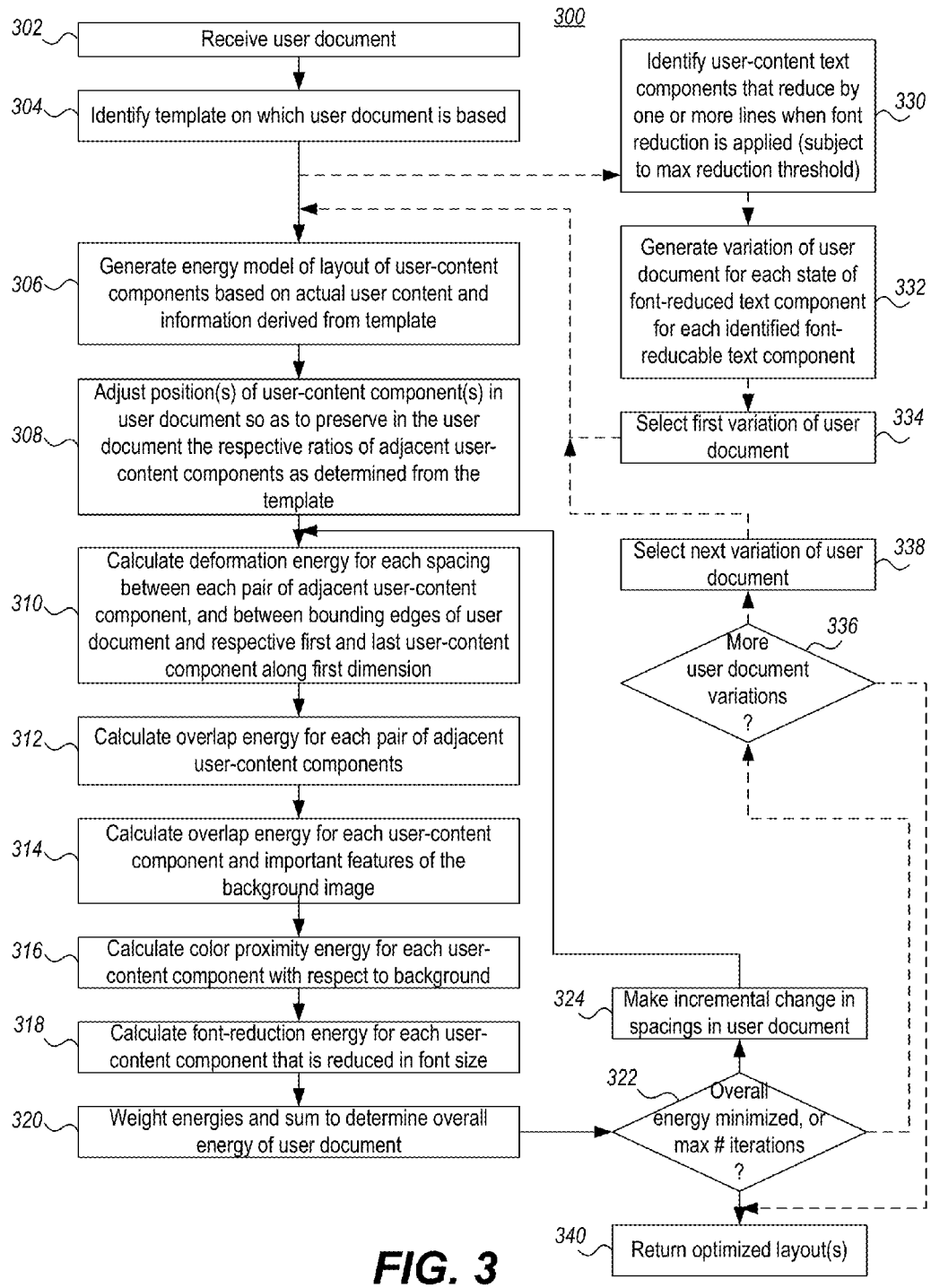
FIG. 3 is a flowchart depicting an exemplary process for optimizing a user document in accordance with embodiments of the invention.

FIG. 3 illustrates a high-level layout optimization process 300 for optimizing a layout of user-content components in a user's document that is constructed based on a template document that includes a plurality of individually-specified components including one or more individually-specified user-content components configured to receive user content from a user of the template document. As illustrated in FIG. 3, the process begins with receiving the user document (step 302). This can be accomplished in multiple different ways, including by way of the example and not limitation, a software call to the optimization function running on a computerized system, the software call including the user document file itself or a path/URL/address of the user document, a software monitoring function which detects a request from a user or another process to perform optimization of the user document, a software function embedded in a document design program that monitors the user-content layout in a user document and automatically optimizes the layout, etc.

Upon obtaining the user document, the process then identifies a design template on which the user document was based (step 304). A user document will typically include an identifier which allows a user design studio program to retrieve the template (or individual components in the template, including layout, text components, image components, color scheme(s), font scheme(s), background image(s), etc.) and to render it on a user's display screen. The user design program then allows the user to edit the content of various user-content components such as designated user-content text components and/or designated user-content image components.

Once the user document is retrieved and the template on which the user document is based is identified, the optimization process 300 can then generate an energy model of the layout of user-content components in the user document (step 306). In an embodiment, the layout of user-content components in the user document can be analogized to energy in a closed system with boundaries and constraints. The objective function is one which seeks to minimize the various energies in the system, which may include one or more of a spacing deformation energy $E_K$, a user-content component overlap energy $E_{OC}$, a background overlap energy $E_{OB}$, a color proximity energy $E_{CP}$, and a font size reduction energy $E_F$. The energy model is generated based on the attributes (such as size, amount, position, font, color, etc.) of the actual user content in the user-content components, and further based on information derived from the template on which the user document is based. In an embodiment, the distances between adjacent pairs of the user-editable content components in the user document are treated as deformable springs in an energy system. The deformation energy deformation energy $E_K(i)$ of each of the springs in the user document is calculated based on the amount the distance between the respective pair of user-content components diverges from the corresponding spacing distance in the template document, where the distances between adjacent pairs of corresponding user-editable content components in the template represents zero deformation energy.

Given the energy model of the layout of the user-content components 101-107 with the actual user content inserted therein in the user document 200, the process 300 then adjusts the positions of the respective user-content components containing actual user content in the user document 200 so as to preserve in the user document 200 the respective ratios of spacing distances between adjacent user-content components 101/102, 102/103, 103/104, 104/105, 105/106, 106/107, as determined from the template document 100 (step 308).

Figure 1B:
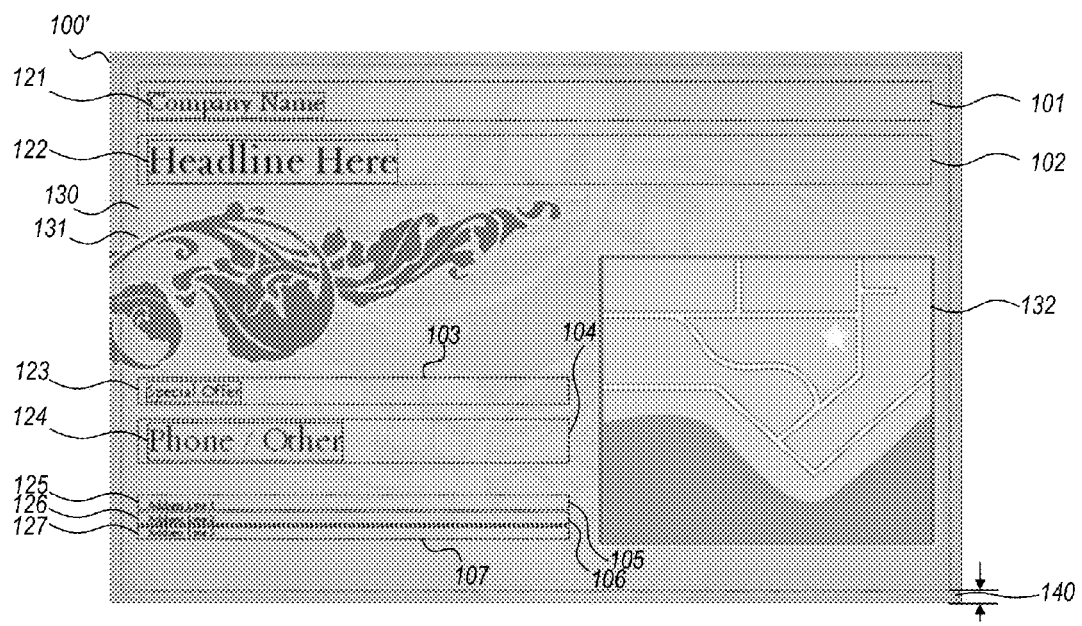
FIG. 1B is a component view of the template document of FIG. 1A.
Figure 1C:
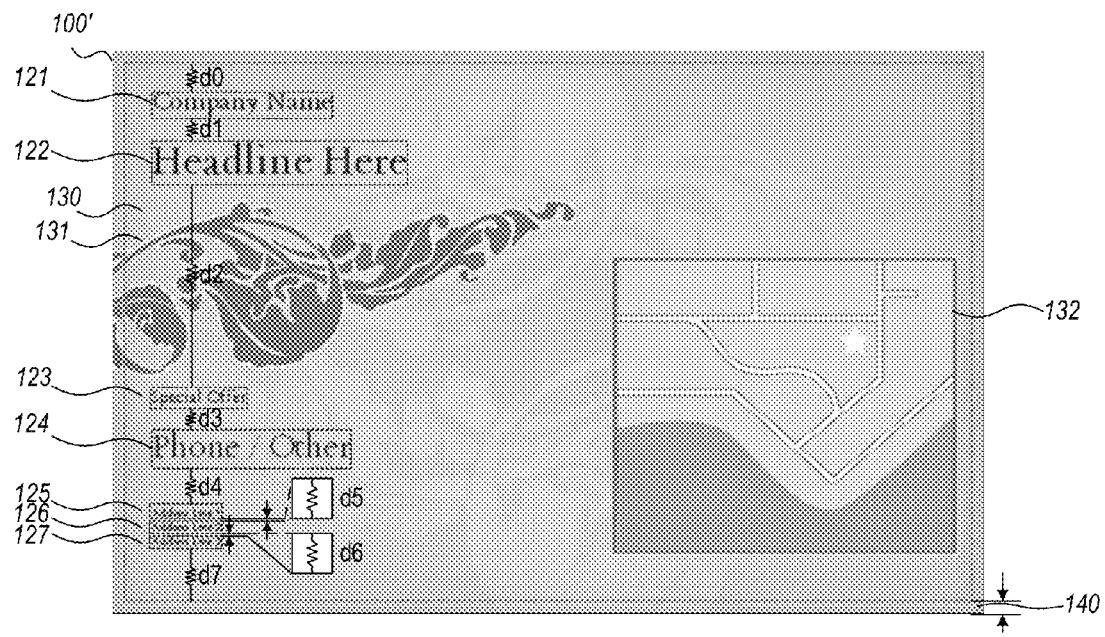
FIG. 1C shows a zero-energy layout of the user-content components of the template of FIG. 1A.

For example, referring now to FIG. 1C, the energy model in the template 100 of the initial (first approximation) layout of the user-content components 101 through 107 from FIG. 1B can be generated by figuratively placing a "spring" d0, d1, d2, d3, d4, d5, d6 and d7 between each pair of dimensionally-adjacent (in this particular example, vertically adjacent) user-content components (d1 through d6) and also between each of the user-content components dimensionally-closest to an outer boundary of available space (d0 and d7). In embodiments of the present invention, the values of d0 through d7 in the template represent the ideal (zero) deformation energy of each of the figurative springs d0 through d7, and thus the ratio of the relative spacing distances d0 through d7 between dimensionally-adjacent user-content components 101 through 107 is held out as the ideal corresponding spacing distances in the user document.

Figure 2A:
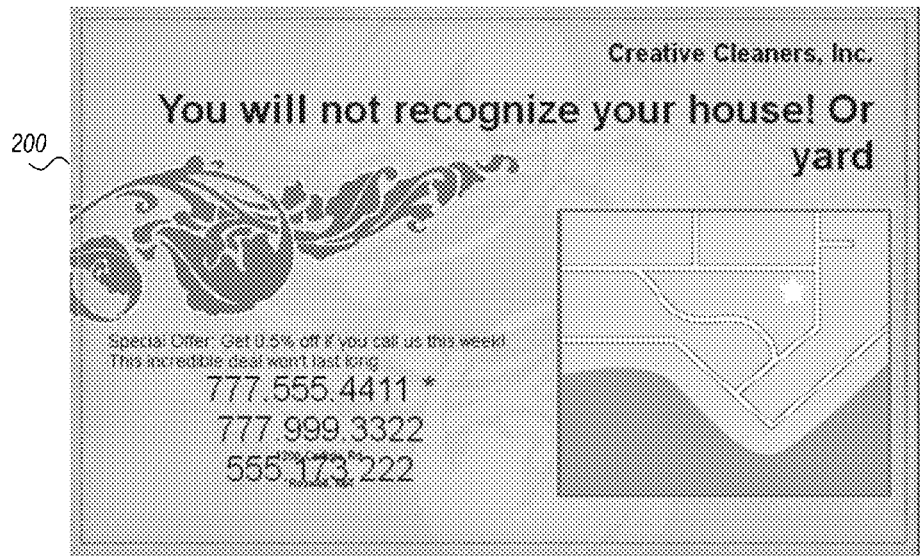
FIG. 2A is an example of a user document generated based on the template of FIG. 1A.
Figure 2B:
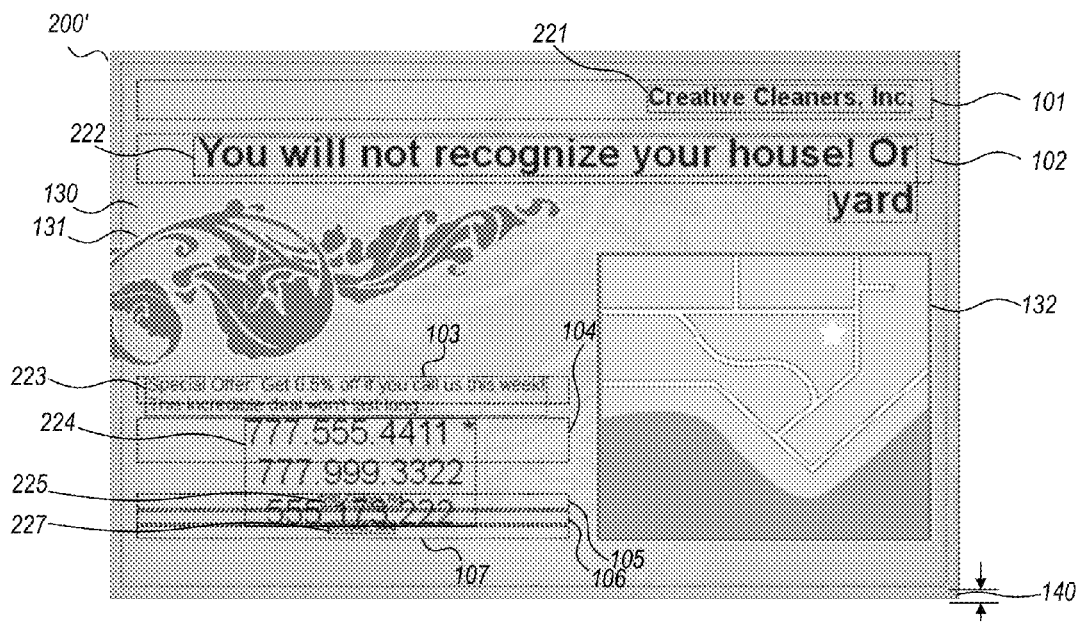
FIG. 2B is a component view of the user document of FIG. 2A.
Figure 2C:
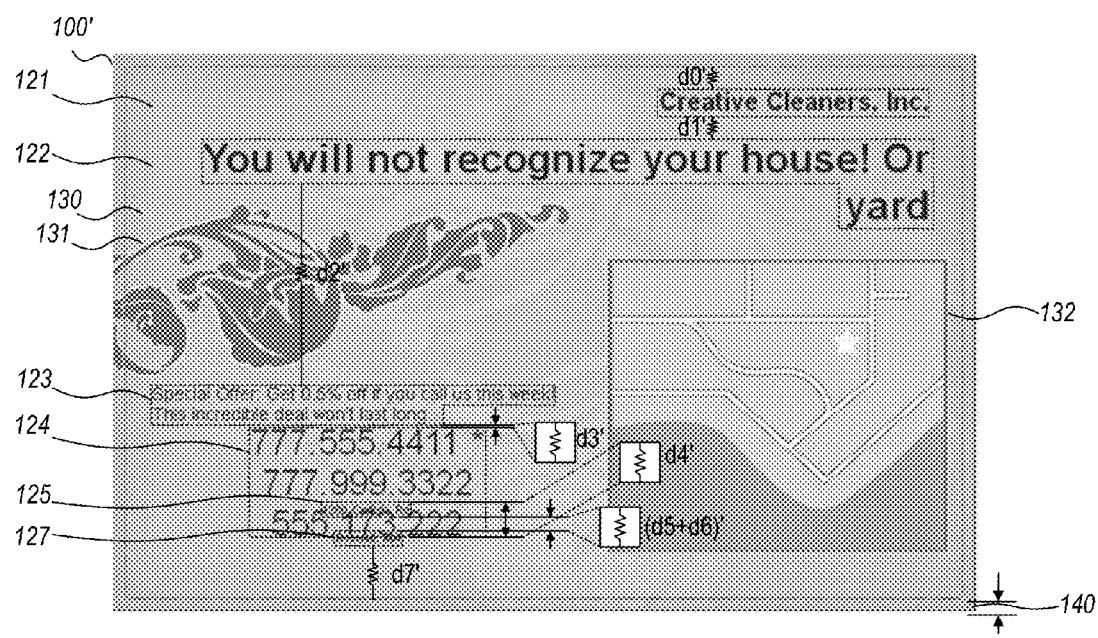
FIG. 2C shows an first approximation layout of the user-content components for the user document of FIG. 2A.

FIG. 2C shows the corresponding energy model of the user document 200, with springs represented as d0' through d7' which correspond to each of the springs d0 through d7 in the template document 100 on which the user document 200 is based.

In order to maintain the respective ratio in the user document 200 as derived from the template document 100 between pairs of adjacent user-content components 101/102, 102/103, 103/104, 104/105, 105/106, 106/107, the process 300 sets the values of d0' through d7' in the user document to achieve the following:

$$d0/d1=d0'/d1',$$

$$d1/d2=d1'/d2',$$

$$d2/d3=d2'/d3',$$

$$d3/d4=d4'/d4',$$

$$d4/d5=d4'/d5',$$

$$d5/d6=d5'/d6', \text{ and}$$

$$d6/d7=d6'/d7'.$$

The total available space, D, (along the measured dimension—in the present example, the dimension defined by the vertical axis of the document) between user-content in the template 100 is $$D=d0+d1+d2+d3+d4+d5+d6+d7,$$

and the total available space D' (along the measured dimension) in the user document 200 is $$D'=d0'+d1'+d2'+d3'+d4'+d5'+d6'+d7'.$$

Often, as in the present example of FIGS. 2A-2C, the amount of the actual user content 221 through 227 inserted into the respective user-content components 101 through 107 in the user document 200 is more or less than the amount of content contemplated by the designer. In these situations, the resulting values of d0', d1', d2', d3', d4', d5', d6' and/or d7' in the user document 200 differ from the values of their counterparts d0, d1, d2, d3, d4, d5, d6 and d7 in the template document 100. Correspondingly, this also affects the value of the amount of total available space D' in the user document. In order to maintain the ratio of the distances between pairs of dimensionally-adjacent components, the values of the relative springs d0' through d7' must also be scaled by the ratio of D'/D. Thus, if D'=k*D then d0'=k*d0, d1'=k*d1, d2'=k*d2, d3'=k*d3, d4'=k*d4, d5'=k*d5, d6'=k*d6, and d7'=k*d7. That is, a first approximation of the optimal layout of the user document 200 is calculated by scaling the spacing distances d0, d1, d2, d3, d4, d5, d6 and d7 by D'/D.

As is seen in the example of FIG. 2C, the first approximation to optimizing the spacing distance d0', d1', d2', d3', d4', d5', d6' and d7' can result in overlap of content between components. Furthermore, as a result of user entry of text content, the text content of one or more of the components may overlap important features in the background image, or the color of the text content may be too proximal to the color of the background over which it lies so as not to produce sufficient contrast for visual distinction between a particular text content and its background. Accordingly, for all of these reasons, overlap conditions must be detected. If an overlap condition is detected, one or more of the user-content components is adjusted (in terms of position or text font size) to remove the overlap. Repeated adjustments are made, and the resulting overall energy of the system is calculated for each iteration of adjustments to determine an optimal solution to the objective function in view of the boundary conditions (edges of the document, desired safe zones (typically along edges of document), etc.) and constraints (e.g., important background features which should not be overlapped by user content, limitations in allowed amount of font size reduction, etc.).

Given the first approximation, the process 300 then calculates a deformation energy $E_K(i)$ associated with each spacing, d0' through d7', between each pair of adjacent user-content components (d1' through d6') and between boundary edges of the user document (or alternatively boundary edges of safe zones around boundary edges of the user document) and the respective first and last user-content component along a given dimension (d0' and d7') (step 310)—that is, the deformation energy for each figurative spring d0' through d7'. During the first iteration, the initial spacing distances d0' through d7' are set so as to maintain the same ratios of the spacing distances d0 through d7 between the respective pairs of the user-content components in the template document without considering constraints such as preventing overlap between user-content components, preventing overlap between the content of user-content components and various important background features, and preventing overlap between content of user-content components and portions of the background which do not have sufficient luminosity or brightness or contrast. In an embodiment, the deformation energy $E_K(i)$ is calculated as:

$$\Delta d(i) = \frac{|d(i)+d'(i)|}{d(i)}.$$

In an embodiment for calculating the current vertical spacing of vertically-adjacent components, the current spacing distance d'(i) can be calculated by subtracting from the uppermost upper boundary value (y-axis value) of the lower user-content component the lowermost lower boundary value (y-axis value) of the upper user-content component. For best accuracy, the calculation is performed based on the actual content and not the pre-defined size of the component container. In this calculation, the deformation energy $E_K(i)$ is given as:

$$E_K(i)=(\Delta d(i))^2.$$

The total deformation energy $E_K$ may be represented as:

$$E_K = \Sigma_{i=0}^{N-1} E_K(i),$$

where N is the number of springs (spaces between user-content components or between extremity user-content components and nearest safe zone 140.

As mentioned above, the process 300 also calculates an energy associated with one or more of user-content component overlap, background feature overlap, and/or color-proximity overlap.

In an embodiment, the process 300 calculates a user-content component overlap energy $E_{OC}$ (step 312). In an embodiment, for each pair, i, of adjacent user-content components, a respective component overlap energy component overlap energy $E_{OC}(i)$ is calculated. The overlap energy of a given pair of user-content components increases the more the actual content of a pair of adjacent components overlaps.

In the above deformation-energy calculations, if the value of $d_{current}(i)$ is positive, then the content of the adjacent user-content pair of user-content components does not overlap—that is, $$\text{if } d'(i) \geq 0, \text{ then } E_{OC}(i)=0;$$

If, however, the value of d'(i) is negative, this means that the content of the pair of vertically-adjacent user-content components respectively touch or overlap one another. In this case, in an embodiment the deformation energy is given as:

if $d'(i)<0$, then $E_{OC}(i)=d'(i)^2$.

The overall user-content component overlap energy $E_{OC}$ is calculated as the sum of each individual user-content component overlap energy of each respective pair of user-content components—that is, $E_{OC}=\Sigma_{i=1}^{N-2} E_{OC}(i)$.

In an embodiment, the process 300 may also calculate a background overlap energy $E_{OB}$ (step 314). In an embodiment, for each user-content component, j, which actually contains user content, a respective background overlap energy $E_{OB}(j)$ is calculated. The background overlap energy $E_{OB}(j)$ of a given user-content component increases the more the actual content of the component overlaps an important feature of the background image (or other non-user-editable visible components). The overall background overlap energy $E_{OB}$ is calculated as the sum of each individual background overlap energy $E_{OB}(j)$ of each respective pair of user-content components—that is, $E_{OB}=\Sigma_{j=0}^{M-1} E_{OB}(j)$, where M is the number of user-content components in the user document. (Note: there is a relationship between M and N: N=M+1.)

In order to determine what features in the background image are considered important, in one embodiment the background image is processed to generate a gradient image of the background image. The human eye is sensitive to image features such as edges. In image processing (by computers), image features are most easily extracted by computing the image gradient. The gradient between two pixels represents how quickly the color is changing and includes a magnitude component and a directional component. For a grayscale image of size M×N, each pixel at coordinate (x, y), where x ranges from [0 . . . M−1] and y ranges from 0 to N−1, defined by a function f(x, y), the gradient of f at coordinates (x, y) is defined as the two-dimensional column vector $$\nabla f = \begin{bmatrix} G_x \\ G_y \end{bmatrix} = \begin{bmatrix} \frac{\partial f}{\partial x} \\ \frac{\partial f}{\partial y} \end{bmatrix}.$$

The magnitude of the vector is defined as:

$$\nabla f = mag(\nabla f) = [G_x^2 + G_y^2]^{1/2} = \left[\left(\frac{\partial f}{\partial x}\right)^2 + \left(\frac{\partial f}{\partial y}\right)^2\right]^{1/2}.$$

For a color image of size M×N, each pixel at coordinate (x, y) is defined by a vector having a Red component value R(x, y), a Green component value G(x, y), and a Blue component value B(x, y). The pixel can be notated by a vector of color components as:

$$c(x, y) = \begin{bmatrix} R(x, y) \\ G(x, y) \\ B(x, y) \end{bmatrix}.$$

Defining r, g, and b as unit vectors along the R, G, and B axis of the RGB color space, we can define the vectors $$u = \frac{\partial R}{\partial x}r + \frac{\partial G}{\partial x}g + \frac{\partial B}{\partial x}b$$

and $$v = \frac{\partial R}{\partial y}r + \frac{\partial G}{\partial y}g + \frac{\partial B}{\partial y}b$$

and then define the terms $g_{xx}$, $g_{yy}$, and $g_{xy}$ in terms of the dot product of these vectors, as follows:

$$g_{xx} = u \cdot u = \left|\frac{\partial R}{\partial x}\right|^2 + \left|\frac{\partial G}{\partial x}\right|^2 + \left|\frac{\partial B}{\partial x}\right|^2$$

$$g_{yy} = v \cdot v = \left|\frac{\partial R}{\partial y}\right|^2 + \left|\frac{\partial G}{\partial y}\right|^2 + \left|\frac{\partial B}{\partial y}\right|^2$$

$$g_{xy} = u \cdot v = \frac{\partial R}{\partial x}\frac{\partial R}{\partial y} + \frac{\partial G}{\partial x}\frac{\partial G}{\partial y} + \frac{\partial B}{\partial x}\frac{\partial B}{\partial y}$$

The direction of the gradient of the vector C at any point (x, y), is given by:

$$\theta = \frac{1}{2}\tan^{-1}\left[\frac{2g_{xy}}{g_{xx} - g_{yy}}\right]$$

and the magnitude of the rate of change at (x,y), in the direction of θ, is given by:

$F(\theta)=\{½[(g_{xx}+g_{yy})+(g_{xx}-g_{yy})\cos 2\theta+2g_{xy}\sin 2\theta]\}^{1/2}$.

Figure 1D:
FIG. 1D shows a gradient image of the background image of the template of FIG. 1A.

FIG. 1D depicts the gradient image 130' corresponding to the original background image 130 of the template document 100 in FIG. 1A. As shown, (1) pixels in regions of constant color value map to a zero value in the gradient image (and hence the corresponding gradient pixel is completely dark), (2) pixels corresponding to the onset of a color value step (i.e., an edge) or ramp map to non-zero values in the gradient image, and (3) pixels corresponding to areas of color transition (i.e., more gradual color change) map to proportional non-zero values in the gradient image.

Figure 1E:
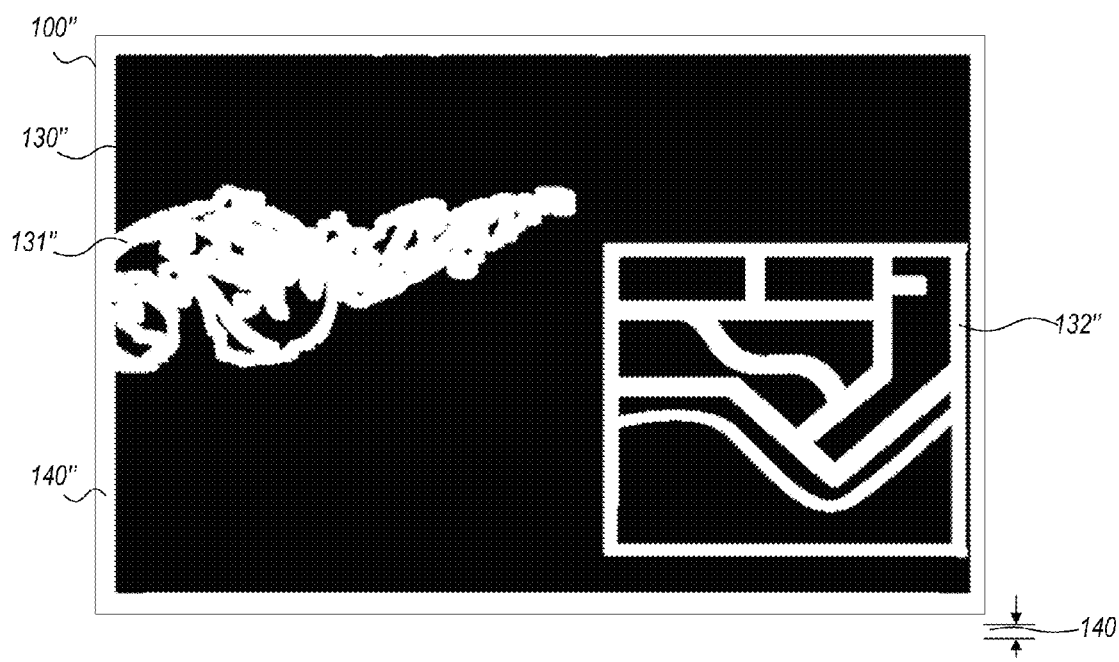
FIG. 1E is a pixel map indicating the positions of the important features in the background image.

In an embodiment, the gradient image 130' is converted to a binary feature bitmap 100", shown in FIG. 1E, which classifies each pixel as either dark or light based on whether the pixel value in the gradient image is above or below a predefined threshold. In an embodiment, the predefined threshold is automatically determined as 1.2 (i.e., 1+x %)*the maximum background gradient value found in the areas covered by all user-content components 101-107 existing in the template document 100. Thus, fuzzy edges are eliminated and objects whose gradients are somewhat small may be considered less important and may be masked out. The features that appear as white pixels in the binary feature bitmap 100" are therefore considered to be the "important" background features.

In an embodiment, the process 300 may use the binary feature bitmap 100" to determine whether and how far user content crosses into the various important background features. For example, by comparing pixel-by-pixel the actual user content of a user-content component with the value of the pixel in the binary feature bitmap, if any pixel in the actual user content corresponds to a white pixel in the binary feature bitmap 100", then that particular user-content component crosses into and overlaps an important background feature. The distance a particular user-content component crosses into the important background feature can be converted into an energy representation. For example, if a particular user-content component j crosses into a particular important background feature by a distance I(j), then in one embodiment, the background overlap energy $E_{OB}(j)$ for that particular user-content component is given by $$E_{OB}(j)=(l(j))^2.$$

The total background overlap energy $E_{OB}$ may be represented as:

$$E_{OB}=\Sigma_{j=0}^{M-1}E_{OB}(j)$$

In an embodiment, the process 300 may also calculate a color proximity energy $E_{CP}$ (step 316) representing how close in luminosity or brightness the color of the actual user content of the user-content component is to the color of the background image on which it lies. The color proximity energy is important to reduce so as to ensure sufficient contrast between the user content of the user-content component and the background over which it is displayed. In an embodiment, for each user-content component, j, which actually contains user content, a respective color proximity energy $E_{CP}(j)$ is calculated. The color proximity energy $E_{CP}(j)$ of a given user-content component increases the closer in luminosity or brightness the actual content of the component is to that of the background image on which the component is overlaid. The color proximity energy of a given user-content component can be calculated using a method similar to the calculation to determine the background overlap energy $E_{OB}$, but generating a binary-color bitmap wherein pixels having a first value (e.g., 0) correspond to areas of the background image with a low contrast color relative to the text color, and a second value (e.g., 1) correspond to areas of the background image with high contrast color relative the color of the text component. The overall color proximity energy $E_{CP}$ is calculated as:

$$E_{CP}=\Sigma_{J=0}^{M-1}E_{CP}(j).$$

In an embodiment, the process 300 may also calculate a font size reduction energy $E_F(n)$ for each user-content component that is reduced in font size (step 318). For any given user-editable text component in a user document, the amount of text in the component may be such as to wrap to subsequent lines, thereby increasing the height of the actual content of the text component. If the last line contains only one or a few small words, a reduction in font size can result in the entire text content fitting in one or more fewer lines. The process 300 may search for text components that can be reduced by one or more lines by way of a font size reduction (step 330). Because the purpose of the objective function of the process 300 is to most closely imitate the aesthetic qualities of the underlying template 100 on which the user document 200 was built, font size reduction is not favored, and as such, it may be desirable to allow font size reduction only up to a certain font size reduction threshold. For example, a threshold could be set at 20%, which limits the maximum amount a font size can be reduced to a 20% reduction. If font size reduction (subject to the maximum font size reduction threshold) is found to reduce the number of lines for a number, N, of user-content text components, then in an embodiment a number ($2^N$) of layout variations are generated (step 332) and the deformation energy $E_K$, user-content component energy, background overlap energy $E_{OB}$, and/or color proximity energy $E_{CP}$ are calculated for each layout variation (iterating through steps 334, 306 through 324, 336 and 338).

For example, if the process 300 finds one (N=1) text component in the user document which could be reduced by at least one line by applying font size reduction, then two ($2^1$) variations of the user document are generated. The overall energy of each of the document variations is separately optimized, and preferably, the optimized variation having the lowest overall energy is selected (step 340) for automatic use or for display to the user. As another example, if two (N=2) text components are found in which font size reduction could be applied to reduce the line count in the respective text components, then there will be four ($2^2$) document variations to optimize and compare.

Returning to FIG. 3, once the various total energies are calculated, an overall energy of the current mutation of the user document is calculated (step 320). In an embodiment, each of the calculated energies, including the total deformation energy $E_K$ and one or more of the total user-content component overlap energy $E_{OC}$, the total background overlap energy $E_{OB}$, the total color proximity energy $E_{CP}$, and/or the font size reduction energy $E_F$, is summed to obtain the overall energy of the current mutation of the user document. Thus, $$E=E_K+E_{OC}+E_{OB}+E_{OCP}+E_F$$

In an embodiment, the different energies are weighted to favor various types of energies over others in order to define a set of priorities among the possible changes to the relative spacing distances, the amount of overlap, and the font-reduction. For example, since the objective function of the optimization problem is to mimic the aesthetic value of the template document, greater deference is attributed to the relative spacing distances between user-content components and the font size set by the designer of the template than is given to reducing line count. Thus, the font size reduction energy $E_F$ may be weighted higher than the deformation energy $E_K$ such that if the size of the font of one or more text components has been reduced in a particular variation of the user document, a higher penalty is attributed to the font size reduction in the energy equation than is attributed to adjustments in the spacing distances between adjacent component pairs. The weighted energy equation is given by $$E=w_KE_K+w_{OC}E_{OC}+w_{OB}E_{OB}+w_{OCP}E_{OCP}+w_FE_F$$

where $w_K$ is the weight attributed to the deformation energy $E_K$, $w_{OC}$ is the weight attributed to the component overlap energy $E_{OC}$, $w_{OB}$ is the weight attributed to the background overlap energy $E_{OB}$, $w_{OCP}$ is the weight attributed to the color proximity energy $E_{CP}$, and $w_F$ is the weight attributed to the font size reduction energy $E_F$.

The process 300 iterates, making one or more small adjustments to one or more of the spacing distances d0' through d7' in the user document (to generate a document mutation) (step 324) until the overall energy of the current mutation of the user document (for the current user document variation, if font-reduction is implemented) is minimized or a maximum number of iterations has been reached (step 322).

If there are multiple variations of the user document (for example, as generated in step 322), then the process 300 checks to see if there are further unprocessed variations to optimize (step 336), and if so, selects an unprocessed variation (step 338) and repeats the optimization process (steps 306 through 324). Once all variations of the user document have been optimized, the process 300 then selects one or more variation(s) of the user document with the lowest overall energy for automatic selection or for presentation to the user for user selection.

There are multiple different mathematical/numerical algorithms for solving optimization problems of the type described herein, each with its own advantages and disadvantage, including the well-known "Gradient Descent" and, the "L-BFGS-B" algorithm (limited-memory Broyden-Fletcher-Goldfarb-Shanno (BFGS) algorithm extended to handle limited box constraints), as utilized in the preferred embodiment.

Figure 4A:
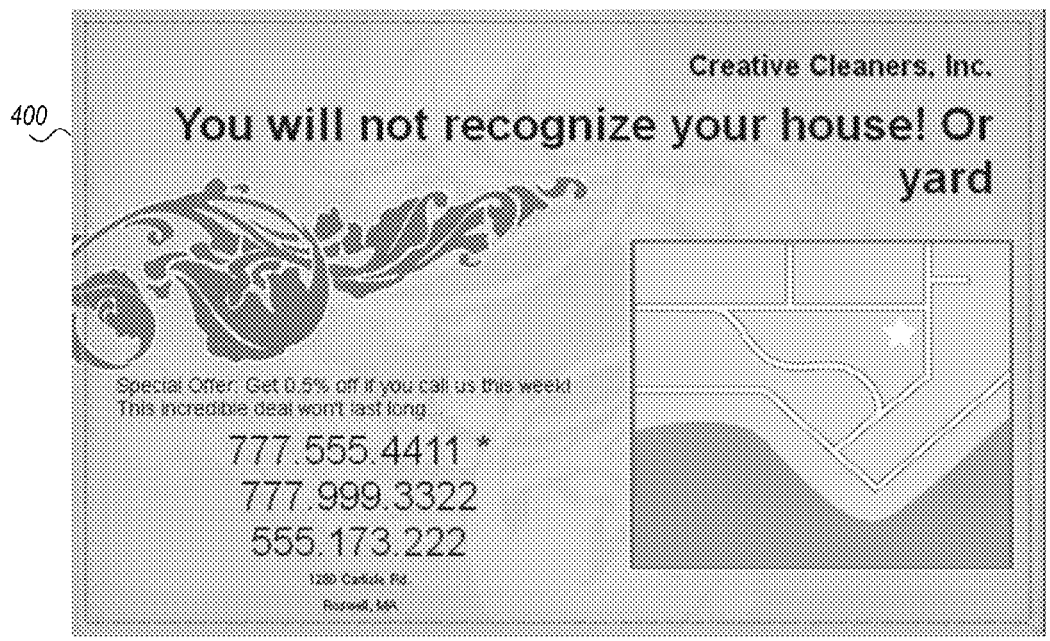
FIG. 4A is a view of an optimized version of a first variation of the user document of FIG. 2A.
Figure 4B:
FIG. 4B illustrates the optimized variation of FIG. 4A in a "debug" mode.

FIG. 4A shows an example of an optimized variation of the user document 200 of FIG. 2A. FIG. 4B illustrates the optimized variation 400 in a "debug" mode 400' which shows the user-content text components as defined in the template, the actual size of the text content of each component, the safe zones, and the important background features. In this optimized variation 400, the weight of the font size reduction penalty was relatively large, whereas the weightings of deformation and background overlap energies was relatively smaller. As a result, both multi-line text components 102 and 104 remained multi-line in the optimized variation 400, whereas the component spacing is relatively preserved and the content of the components do not overlap into any of the background features.

Figure 5A:
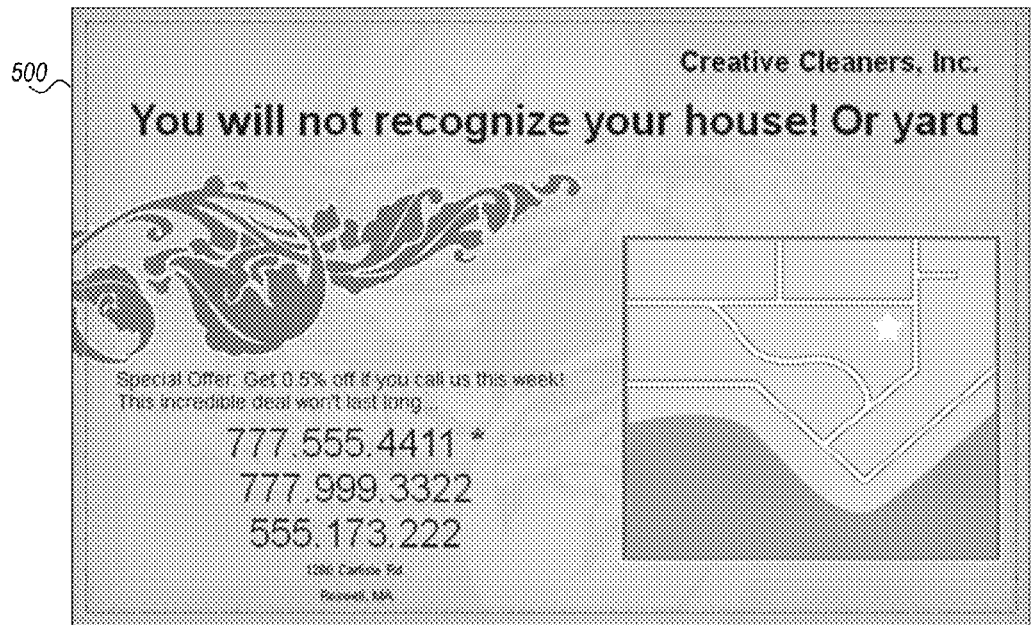
FIG. 5A is a view of an optimized version of a second variation of the user document of FIG. 2A.
Figure 5B:
FIG. 5B illustrates the optimized variation of FIG. 5A in a "debug" mode.

FIG. 5A shows an example of an optimized second variation 500 of the user document 200 of FIG. 2A, and FIG. 5B shows the second variation 500 in debug mode 500'. In this variation, the font size of component 102 was slightly reduced, causing the headline component 102 to retract to a one-line text component.

Figure 6A:
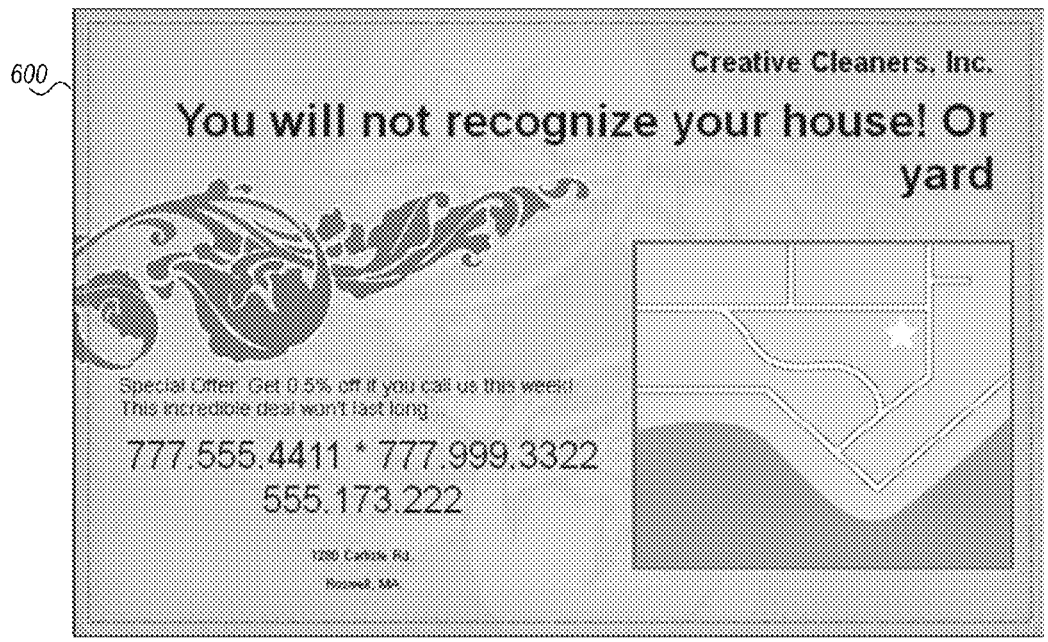
FIG. 6A is a view of an optimized version of a third variation of the user document of FIG. 2A.
Figure 6B:
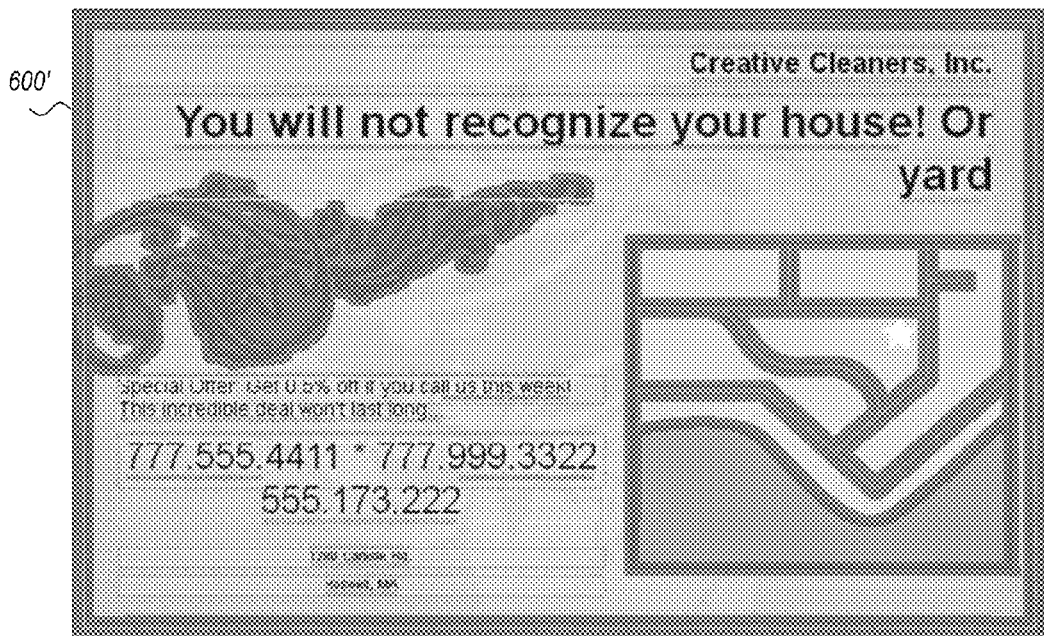
FIG. 6B illustrates the optimized variation of FIG. 6A in a "debug" mode.

FIG. 6A shows an example of an optimized third variation 600 of the user document 200 of FIG. 2A, and FIG. 6B shows the third variation 600 in debug mode 600'. In this variation, the font size of component 104 was slightly reduced, causing the phone number component 104 to retract from three lines to two lines.

Figure 7A:
FIG. 7A is a view of an optimized version of a fourth variation of the user document of FIG. 2A.
Figure 7B:
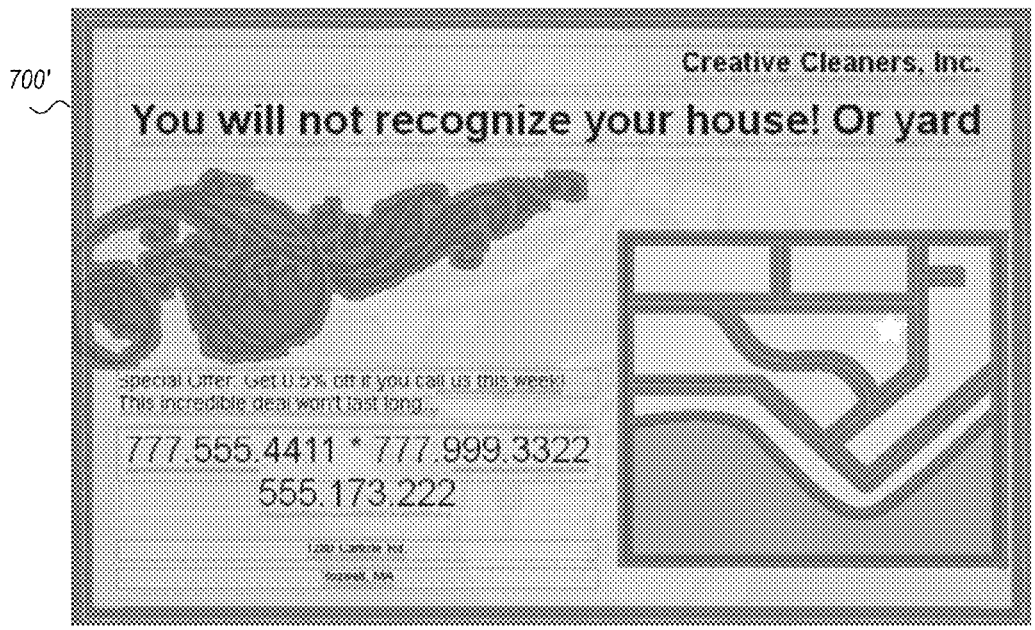
FIG. 7B illustrates the optimized variation of FIG. 7A in a "debug" mode.

FIG. 7A shows an example of an optimized different variation 700 of the user document 200 of FIG. 2A, and FIG. 7B shows the different variation 700 in debug mode 700'. In this variation, the font size of both components 102 and 104 were slightly reduced, causing the headline component 102 to retract to a one-line text component and the phone number component 104 to retract from three lines to two lines.

The layout optimization process 300 can be advantageously employed in a number of different applications. In one embodiment, the layout optimization process 300 is employed in a document design system which allows a user to select a document template, and add/change/delete/and edit various individual components of the template to generate a customized design of a document.

Figure 8:
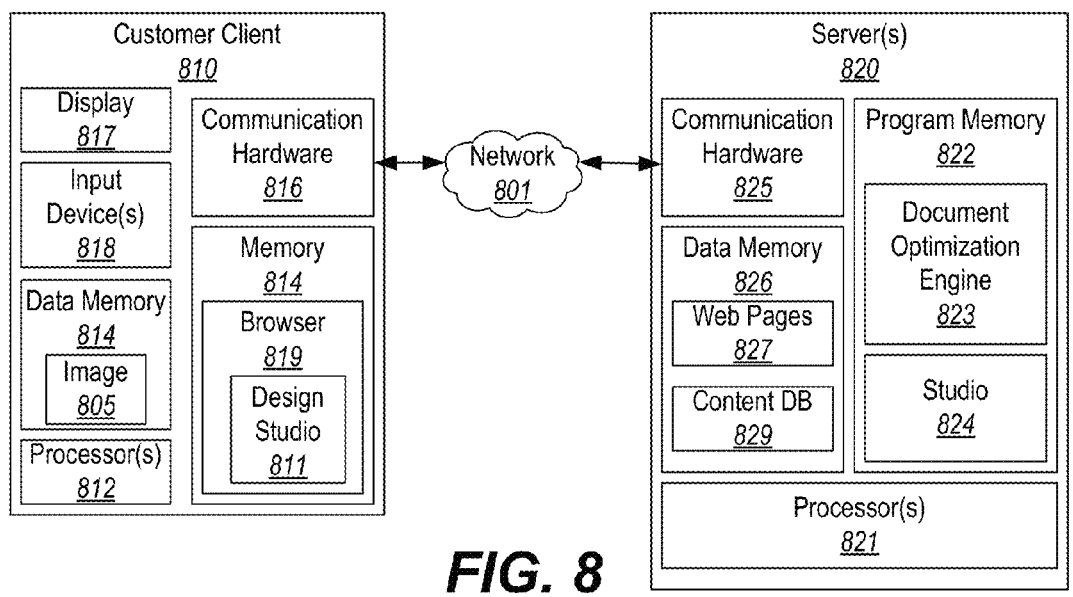
FIG. 8 is a block diagram of a networked system in which embodiments of the invention may operate.

For example, FIG. 8 is a block diagram illustrating an exemplary system in which the invention may operate. As illustrated, a server 820 includes one or more processors 821, program memory 822 which stores computer-readable instructions for processing by the processor(s) 821, data memory 826 for storing data such as image(s) 805 received from customers operating client computer(s) 810, and communication hardware 825 for communicating with remote devices such as client computer(s) 810 over a network 801 such as the Internet. The program memory 822 includes program instructions implementing a studio engine 824 and a document optimization engine 823.

One or more client computer(s) 810 (only one shown) is conventionally equipped with one or more processors 812, computer storage memory 814 for storing program instructions and data, and communication hardware 816 configured to connect the client computer 810 to the server 820 via the network 801. The client 810 includes a display 817 and input hardware 818 such as a keyboard, mouse, etc., and executes a browser 819 which allows the customer to navigate to a web site served by the server 820 and displays web pages 827 served from the server on the display 817.

Memory 822, 826, and 814 may be embodied in any one or more computer-readable storage media of one or more types, such as but not limited to RAM, ROM, hard disk drives, optical drives, disk arrays, CD-ROMs, floppy disks, memory sticks, etc. Memory 822, 826, and 814 may comprise permanent storage, removable storage, and/or cache storage, and further may comprise one contiguous physical computer readable storage medium, or may be distributed across multiple physical computer readable storage media, which may include one or more different types of media. Data memory 826 stores web pages 827, typically in HTML or other web-language format to be served to client computers 810 and displayed in client browsers 819. Data memory 826 also includes a content database 829 that stores content such as various component layouts, patterns designs, color schemes, font schemes and other information used by the server 120 to enable the creation and rendering of product templates and images. Co-owned U.S. Pat. No. 7,322,007 entitled "Electronic Document Modification", and U.S. Pat. Publication No. 2005/0075746 A1 entitled "Electronic Product Design", each describes a Web-based document editing system and method using separately selectable layouts, designs, color schemes, and font schemes, and each is hereby incorporated by reference in its entirety into this application.

In an embodiment, the client browser 819 downloads a design studio program 811 from the server 820. The design studio program 811 executes in the client browser 819 and interacts with the studio engine 824 operating on the server 820 to enable the display and user-editing of document templates to allow the user of the client machine 810 to customize the content and edit various attributes of user-content components of a selected template document. The templates each have at least some separately specified user-content components that are intended to be edited by the user during the customization or personalization of the template to generate a customized/personalized user document. The document optimization engine 823 executes at the server 820 and operates to optimize the layout of the user-content components in a user document. The document optimization engine 823 can perform the optimization at the server without user request (i.e., automatically), or the design studio 811 can offer an optimization option such as a button or control on the studio graphical user interface which triggers the optimization of the user document by the document optimization engine upon selection of the button or control by the user.

In one embodiment, the server 820 generates one or more designs of matching supplemental products based on user information collected during the creation by the user of a different product during a current or past session on a products vendor website. Example implementations of systems which automatically create one or more matching supplemental products for presentation to the user are described in detail in U.S. Pat. No. 8,041,607 to Sebastien Coursol, U.S. Pat. No. 7,607,084 to Malone et al., U.S. Pat. No. 7,490,057 to Connolly et al., U.S. Pat. No. 7,519,548 to Hanechak et al., each of which is hereby incorporated by reference for all that it teaches. In an embodiment, a matching document is automatically generated by the server 820 according to any of the standard methods described in the above-mentioned United States patents. Prior to presenting the image of the matching product design to the user, the matching product design document is first optimized using the process 300 of the present invention. Once optimized, the image(s) of the optimized matching product design is presented to the user for ordering. The ability to optimize the layout of user-content components in an automatically generated matching product design is advantageous over the prior art in that an automated matching products generation engine can seek to optimize every design it creates so as to prevent automatic creation of products lacking aesthetic quality due to insertion of too much content in a template document. By optimizing the automatically created image(s) of matching products, the vendor need not worry that it is showing proposed matching products to customers which contain component overlap, component background overlap.

Those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Although this preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method for optimizing a layout of a document, the method comprising:
   from a template document having a plurality of individually-specified components each having a corresponding predefined original position and original size, wherein the plurality of individually-specified components comprises at least one user-content component configured to receive user content from a user of the template document, determining a plurality of spacing distances representing ideal spacing distances between the at least one user-content component and corresponding one or more others of the individually-specified components;
   from a user document constructed based on the template document and having at least some user content inserted in the at least one user-content component, determining current spacing distances between the at least one user-content component and the corresponding one or more others of the individually-specified components;
   generating an energy model of the layout of the user document based on the ideal spacing distances from the template document and the current spacing distances in the user document, wherein the energy model models the spacing distances between the at least one user-content component and the corresponding one or more others of the individually-specified components as deformable springs in a closed system, the energy model having a calculated deformation energy for each deformable spring representing an amount the distance between the respective at least one user-content component and a corresponding other of the individually-specified components diverges from the corresponding ideal spacing distance determined from the template document, the energy model further having at least one constraint represented by a calculated at least one of user-content component overlap energy representing how much the at least one user-content component overlaps another user-content component, a background overlap energy representing how much the at least one user-content component overlaps a background component, and a color proximity energy representing how close in color the at least one user-content component is to the color of a background image on which it lies; and
   based on the calculated deformation energy for each deformable spring and the calculated at least one of the user-content component overlap energy, the background overlap energy, and the color proximity energy, adjusting one or more positions of the at least one user-content components in the user document to minimize the energy of the layout in the user document.

2. A method in accordance with claim 1, wherein:
   the ideal spacing distances and the current spacing distances in the respective template document and user document are determined between each pair of dimensionally-adjacent user-content components which are adjacent along one dimension.

3. The method of claim 2, wherein the at least one user-content component comprises a text component.

4. The method of claim 3, wherein the text component allows text-wrapping.

5. A method in accordance with claim 1, wherein:
   the step for determining current spacing distances between the at least one user-content component and the corresponding one or more others of the individually-specified components further comprising calculating current spacing distances between pairs of dimensionally-adjacent user-content components which are adjacent along a given dimension in the user document, each pair of dimensionally-adjacent user-content components having no other user-content component positioned along the given dimension therebetween; and
   the step for adjusting one or more positions of the at least one user-content components in the user document further comprising determining a ratio between dimensionally-adjacent pairs of spacing distances in the template document, and positioning the user content components in the user document such that corresponding ratios between dimensionally-adjacent pairs of spacing distances in the user document match the determined ratios between corresponding dimensionally-adjacent pairs of ideal spacing distances in the template document.

6. The method of claim 5, wherein the at least one user-content component comprises a text component.

7. The method of claim 6, wherein the text component allows text-wrapping.

8. The method of claim 1, wherein the at least one user-content component comprises a text component.

9. The method of claim 8, wherein the text component allows text-wrapping.

10. A system for optimizing a layout of a document, the system comprising:
    one or more processors which determine, from a template document having a plurality of individually-specified components including at least one user-content component configured to receive user content from a user of the template document and each individually-specified component having a corresponding predefined original position and original size, a plurality of spacing distances representing ideal spacing distances between the at least one user-content component and corresponding one or more others of the individually-specified components;
    one or more processors configured to receive and insert at least some user content into at least one user-content component of a user document constructed based on the template document;

one or more processors configured to determine current spacing distances between the at least one user-content component and the corresponding one or more others of the individually-specified components in the user document;

one or more processors configured to generate an energy model of the layout of the user document based on the ideal spacing distances from the template document and the current spacing distances in the user document, wherein the energy model models the spacing distances between the at least one user-content component and the corresponding one or more others of the individually-specified components as deformable springs in a closed system, the energy model having a calculated deformation energy for each deformable spring representing an amount the distance between the respective at least one user-content component and a corresponding other of the individually-specified components diverges from the corresponding ideal spacing distance determined from the template document, the energy model further having at least one constraint represented by a calculated at least one of user-content component overlap energy representing how much the at least one user-content component overlaps another user-content component, a background overlap energy representing how much the at least one user-content component overlaps a background component, and a color proximity energy representing how close in color the at least one user-content component is to the color of a background image on which it lies; and one or more processors configured to adjust one or more positions of the at least one user-content components in the user document to minimize the energy of the layout in the user document based on the calculated deformation energy for each deformable spring and the calculated at least one of the user-content component overlap energy, the background overlap energy, and the color proximity energy.

11. A system in accordance with claim 10, wherein:
the ideal spacing distances and the current spacing distances in the respective template document and user document are determined between each pair of dimensionally-adjacent user-content components which are adjacent along one dimension.

12. The system of claim 11, wherein the at least one user-content component comprises a text component.

13. The system of claim 12, wherein the text component allows text-wrapping.

14. A system in accordance with claim 10, further comprising:
one or more processors configured to calculate current spacing distances between pairs of dimensionally-adjacent user-content components which are adjacent along a given dimension in the user document, each pair of dimensionally-adjacent user-content components having no other user-content component positioned along the given dimension there between; and one or more processors configured to determine a ratio between dimensionally-adjacent pairs of spacing distances in the template document, and positioning the user content components in the user document such that corresponding ratios between dimensionally-adjacent pairs of spacing distances in the user document match the determined ratios between corresponding dimensionally-adjacent pairs of ideal spacing distances in the template document.

15. The system of claim 14, wherein the at least one user-content component comprises a text component.

16. The system of claim 15, wherein the text component allows text-wrapping.

17. The system of claim 10, wherein the at least one user-content component comprises a text component.

18. The system of claim 17, wherein the text component allows text-wrapping.

\* \* \* \* \*